(12) United States Patent
Manglik et al.

(10) Patent No.: US 9,292,343 B2
(45) Date of Patent: Mar. 22, 2016

(54) METHOD AND SYSTEM FOR PERFORMING DEPLOYMENT MANAGEMENT

(75) Inventors: Gaurav Manglik, Mountain View, CA (US); Vijay Nichinbatl Sriram, Bangalore (IN); Shamik Ganguly, Bangalore (IN); Rohit Sah, New Delhi (IN); Sourav Mukherjee, South San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 686 days.

(21) Appl. No.: 12/827,856

(22) Filed: Jun. 30, 2010

(65) Prior Publication Data
US 2012/0005646 A1    Jan. 5, 2012

(51) Int. Cl.
| | |
|---|---|
| G06F 9/44 | (2006.01) |
| G06F 9/48 | (2006.01) |
| G06F 9/445 | (2006.01) |

(52) U.S. Cl.
CPC .............. *G06F 9/4856* (2013.01); *G06F 8/60* (2013.01)

(58) Field of Classification Search
USPC .................. 717/170–174, 120; 709/208, 220, 709/221–224; 707/756, 4, 102; 718/102; 370/230
IPC ................ H04L 67/10,67/34; G06F 8/60, 8/65, G06F 9/4856
See application file for complete search history.

(56) References Cited

U.S. PATENT DOCUMENTS

| | | | |
|---|---|---|---|
| 7,752,214 B2 * | 7/2010 | Pizzorni et al. ............... | 707/756 |
| 7,996,814 B1 * | 8/2011 | Qureshi et al. ............... | 717/120 |
| 8,296,756 B1 * | 10/2012 | Feeser et al. .................. | 717/173 |
| 2003/0131084 A1 * | 7/2003 | Pizzorni et al. ............... | 709/223 |
| 2003/0233431 A1 * | 12/2003 | Reddy et al. .................. | 709/221 |
| 2005/0125438 A1 * | 6/2005 | Krishnaswamy et al. .... | 707/102 |
| 2005/0283759 A1 * | 12/2005 | Peteanu et al. ................ | 717/120 |
| 2006/0080417 A1 * | 4/2006 | Boutboul et al. ............. | 709/220 |
| 2006/0080656 A1 * | 4/2006 | Cain et al. ..................... | 717/174 |
| 2006/0215556 A1 * | 9/2006 | Wu et al. ....................... | 370/230 |
| 2007/0033276 A1 * | 2/2007 | Brockhoff et al. ............ | 709/224 |
| 2008/0052760 A1 * | 2/2008 | McRae et al. ..................... | 726/2 |
| 2008/0215558 A1 * | 9/2008 | Marinelli et al. ................. | 707/4 |
| 2010/0162226 A1 * | 6/2010 | Borissov et al. .............. | 717/173 |
| 2010/0175060 A1 * | 7/2010 | Boykin et al. ................. | 717/173 |
| 2011/0138391 A1 * | 6/2011 | Cho et al. ....................... | 718/102 |

* cited by examiner

*Primary Examiner* — Tuan Vu
(74) *Attorney, Agent, or Firm* — Vista IP Law Group, LLP

(57) ABSTRACT

A system, method, computer program product are shown for automatically performing deployment activities that can handle deployments for any-sized organization, even for deployments at the enterprise level. According to some approaches, modeling is performed to generate a model of the components in the computing environment. Dependency graphs can be generated for the deployment, and used to then automatically perform the deployment.

30 Claims, 20 Drawing Sheets

Figure 4

Application Server Model 402

404 → Properties
- Name, Value
- Ports
- SID

406 → Operations
- Step 1: Bring down
- Step 2: Deploy
- Step 3: Bring back up

| Exception 1 | Exception 2 | ... |
|---|---|---|
| If no dependencies, then run standalone | Deployment ordering exceptions | |

408 → Relationships
- Upstream dependency to databases
- Downstream dependency to applications

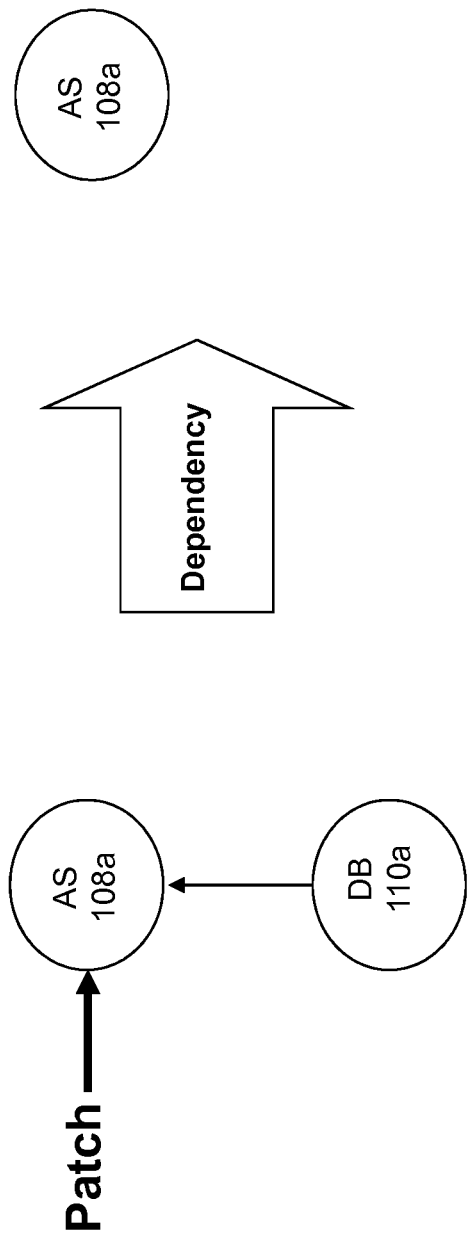

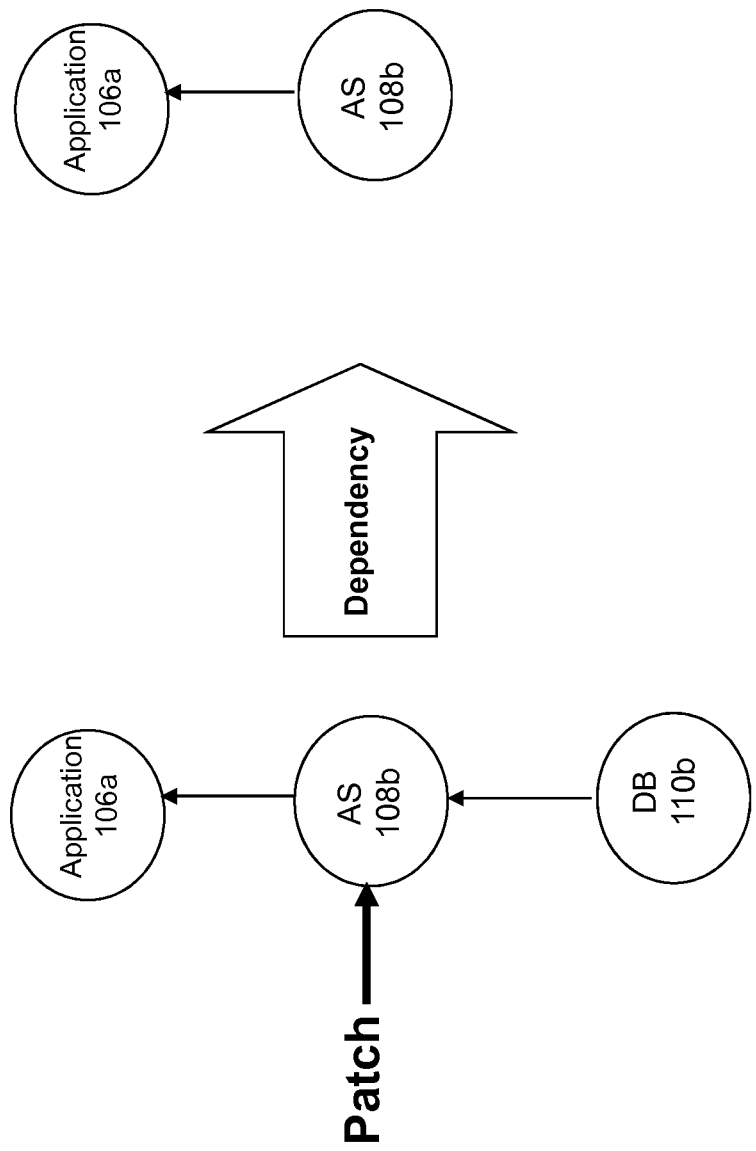

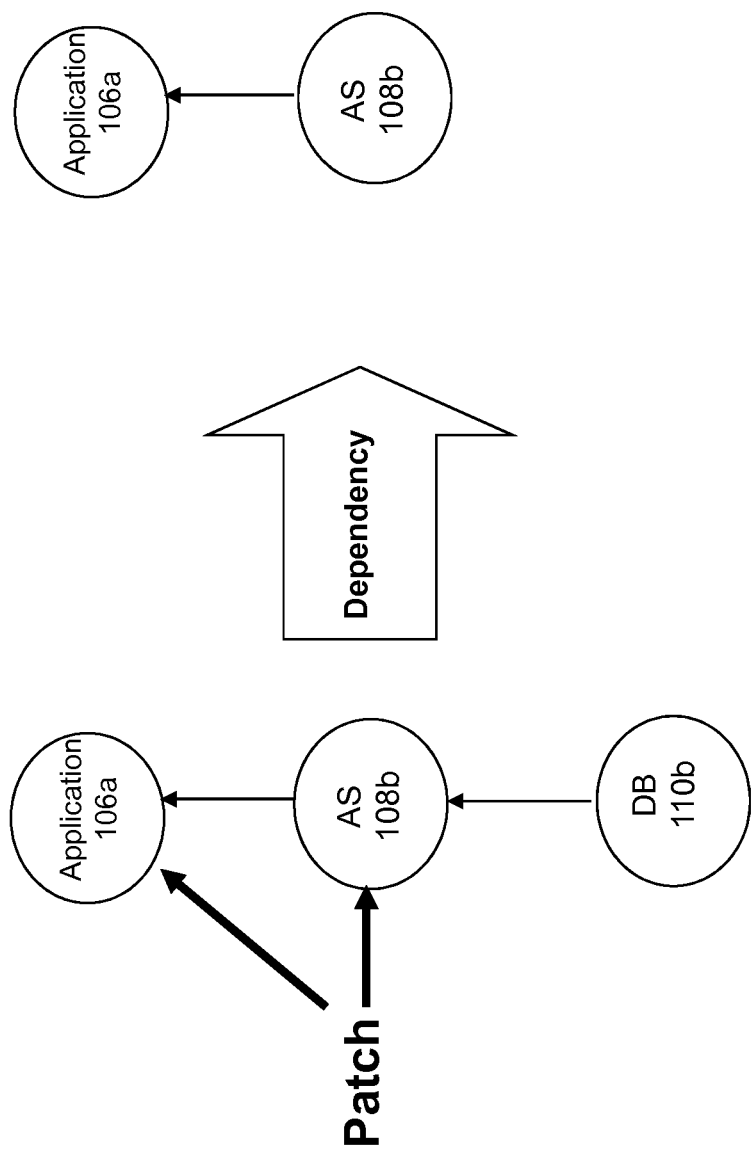

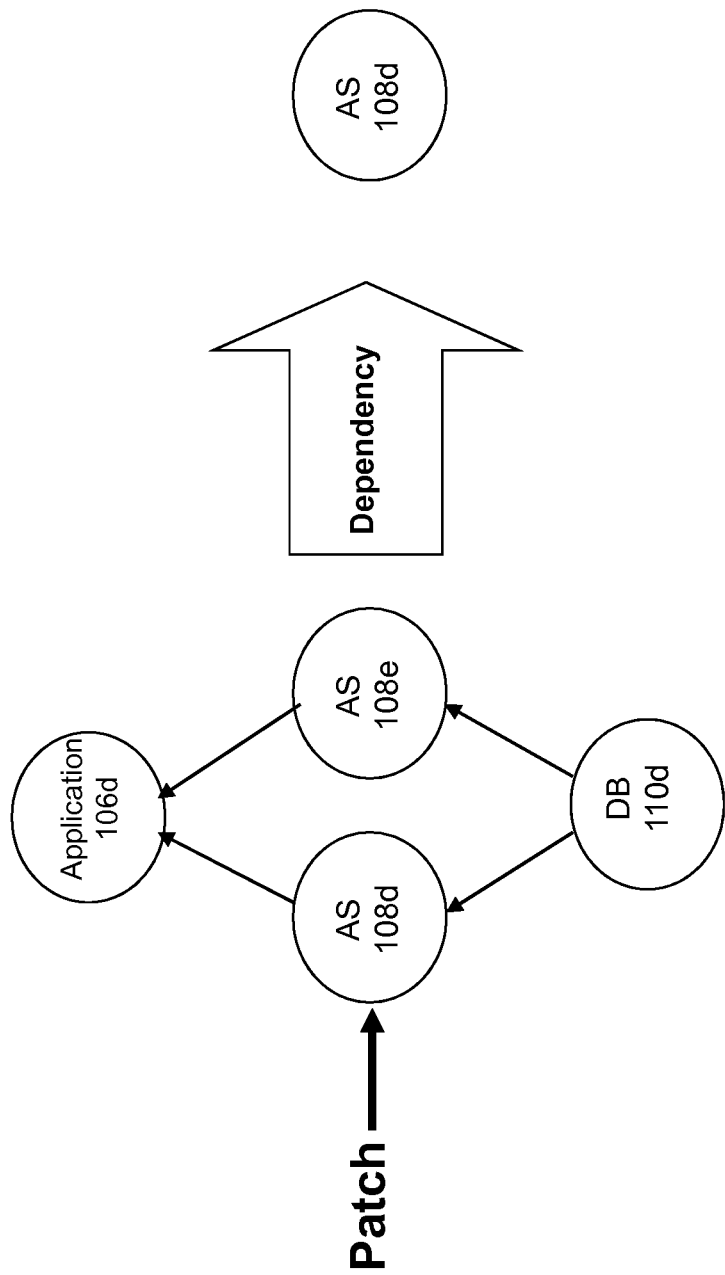

METHOD AND SYSTEM FOR PERFORMING DEPLOYMENT MANAGEMENT

FIELD

The invention relates to the field of deployment management.

BACKGROUND AND SUMMARY

In the computing field, the term "deployment" refers to the act of implementing software and computing resources into a computing environment. Examples of deployment activities include provisioning, patching, and configuration/reconfiguration. Provisioning refers to the distribution of software and resources into the computing environment, and is often used to in the context of an installation of fresh software on an enterprise hardware infrastructure. Patching refers to the act of updating or modifying the software and resources, and is often used in the context of the periodic activity of deploying fixes for problems/bugs that are reported after the main release of software. Configuration and reconfiguration refer to the acts of implementing or changing the properties or variables for the software, resources, or computing environment.

Conventionally, deployment is a task that requires significant human intervention to ensure that deployment activities are properly and optimally orchestrated for a given software/architectural environment. The software/architectural environment is often referred to as the software "stack" or "topology". It is often required that such operations are performed while strictly adhering to the guidelines established by the vendors of the software and other architectural components.

One possible approach to implement deployment activities is to manually perform each and every step of the deployment. In this approach, highly skilled IT personnel would receive documentation that describe the deployment activities, and would manually follow the documentation to take every action that is needed across all of the components in the topology to perform the deployment.

Unfortunately, the manual approach is just not feasible when considered in the context of a large modern organization. For example, at the level of an enterprise, manually performed deployment activities would be excessively costly and time-consuming due to the extensive quantity of the items often being deployed as well as the complexities of the environments in which the deployment needs to take place. This is particularly problematic for the typical IT department at the data center of a large-scale corporation which handles the needs of a very large number of applications and users spread across many types of computing architectures and topologies. Attempting to perform deployment in a manual manner in this type of environment would be a very error-prone, time-consuming, and difficult task.

Another possible approach is the template or procedure-based approach for deployment, in which templates and/or procedures are distributed by vendors to accomplish the deployment activities. In this approach, the template/procedure corresponds to a particular deployment scenario or use-case, and has the requisite scripts, programs, and associated files to perform the deployment for that particular deployment scenario. The customer would fill in certain fields in the template that are specific to the customer, such as IP addresses and machine identifiers, which allows the scripts, programs, and files to be used to correctly implement deployment in the customer's environment. The drawback, however, with this template-based approach is that it is highly specific to the particular deployment scenario or use-case to which it is directed. When the customer environment is different from the expected deployment scenario or use-case, then the template may no longer be useful, or it may require the customer to perform many highly manual activities to customize the materials so that they are useful in the customer environment.

Therefore, there is a need for an improved approach to implement deployment, particularly for enterprise deployments, which addresses the drawbacks associated with the prior solutions.

Embodiments of the present invention provide an approach for automatically performing deployment activities that can handle deployments for any-sized organization, even for deployments at the enterprise level. According to some embodiments, modeling is performed to generate a model of the components in the computing environment. Dependency graphs can be generated for the deployment, and used to then automatically perform the deployment.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIGS. 4-5 show example models.

FIG. 6A-B, 7A-D, 8A-B, 9, 10, and 11A-D show illustrative examples of deployment for different components in a topology.

DETAILED DESCRIPTION

The present invention is directed to an improved approach for performing deployment activities. The invention addresses the issue of deployment for a variety of configurations, and is a generic method as opposed to the solutions which work only for well-defined software configurations. The inventive approach is "intelligent" as it accomplishes such activities with minimal or no human interference. According to some embodiments, the invention establishes dependencies in the topology and also determines any software version relationships. The approach is optimal as it performs such activities in a best-practice fashion as established by an enterprise, and ensures that software applications are stopped for zero or minimal possible time during such tasks.

Examples of deployment activities implemented by the invention include provisioning, patching, and configuration/reconfiguration. For the purposes of illustration, some embodiments may be described in conjunction with specific deployment activities, such as patching. It is noted, however, that the described invention may be applicable to any type of deployment, and is not to be limited to the specific examples shown unless claimed as such.

Embodiments of the invention are implemented with orchestration of the deployment activities such that vendor and supplier best-practices are adhered to, where the end-result of the configuration is a supported configuration for each of the components that are a part of the topology. In addition, the orchestration ensures that the deployment is performed in the correct order in consideration of dependencies between components in the topology. The orchestration also ensures that co-requisite/pre-requisite and post-requisite changes are factored in. Finally, embodiments of the invention can optimize to minimize the overall downtime of applications, or of particular software processes should be minimized.

These are activities for which it is that just not feasible to be performed manually for most organizations, using conventional technologies. Further, given the complexity of modern enterprise software stacks, any manual orchestration would not produce an optimal result. The embodiments of the present invention provide an automated approach that significantly reduces the costs of performing deployment, reduces errors, and can handle any type of topology and is not limited to particular well-defined software topologies.

Embodiments of the invention provide features to understand the software dependencies, and to orchestrate the deployment tasks in the correct order. This type of orchestration to identify dependencies is very difficult to perform manually. Moreover, this orchestration becomes even more difficult if one has to ensure high-availability, e.g., where execution of these operations should be such that the software processes are not required to be shut down, or are brought down for the minimum time possible.

Figure 1:
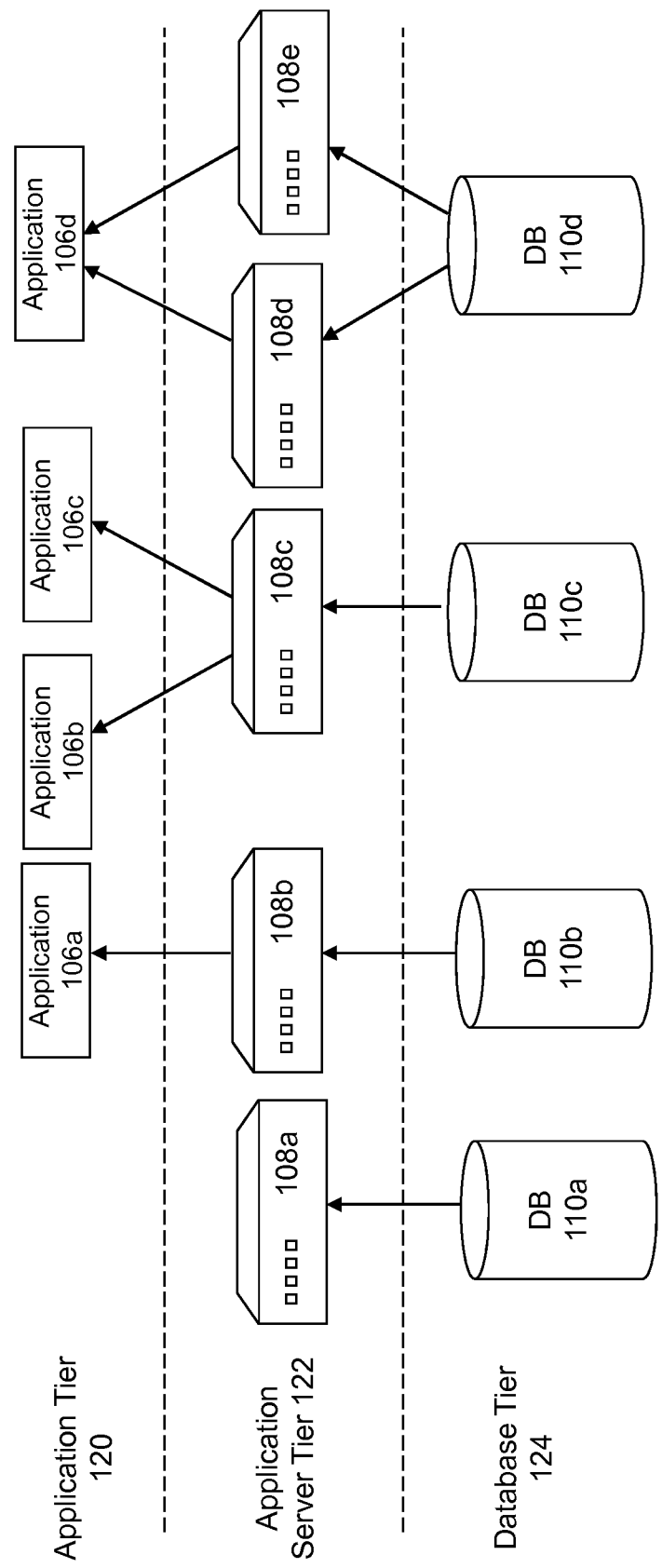
FIG. 1 illustrates an example topology.

To explain, consider the example topology shown in FIG. 1, which includes components at three different tiers. A first tier 120 is at the application level, a second tier 122 is at the application server level, and a third tier 124 is at the database level. The application tier 120 is illustrated shown to include applications 106a, 106b, 106c, and 106d. The application server tier 122 includes application servers 108a, 108b, 108c, 108d, and 108e. The database tier 124 includes database servers 110a, 110b, 110c, and 110d.

Components at each tier interact with components at other tiers in a manner that causes certain dependencies to exist. In this example, application 106a is downstream of, and dependent on, application server 108b being available. Application server 108b, in turn, is downstream of and is dependent upon database 110b being available. Therefore, this is an example of a situation in which a first software process (e.g., for application 108a) depends on a second software process (e.g., for the application server 108b), and if the second process for the application server 108b is to be patched, then patching this second process may requires stopping all dependencies such as the first process for the application 106a. This chain of dependencies exist as well for the other components shown in FIG. 1.

Even within a single node in the topology, the deployment activities can be fairly complex. For example, there may need to be a certain order to deployment steps, e.g., relating to configurations, patching, running scripts to bring the node up or down, downloading contents, etc. When these activities are considered in the context of an extensive topology having many different nodes, and where the nodes themselves have dependency inter-relationships, the complexities can be overwhelming.

As is evident, the complexity and inter-dependency of software components ensures that conventional approaches which are manual in nature are not sufficient to accomplish enterprise-wide patching and provisioning. Embodiments of the invention provide an approach for automatically identifying these dependencies and to perform deployment for a variety of configurations. Some embodiments can greatly reduce the complexities of managing large configurations by managing the entire topology as one entity.

Figure 2:
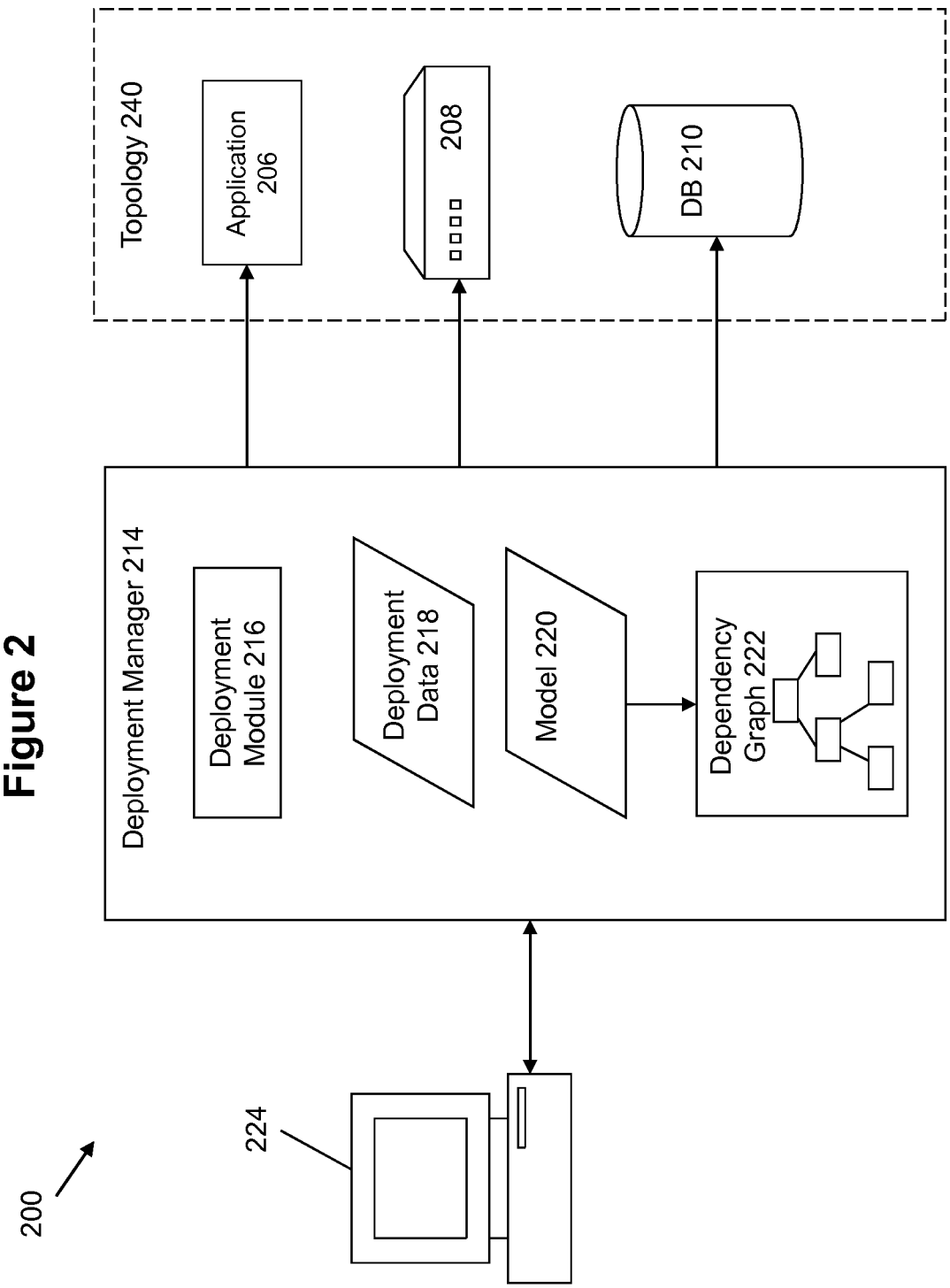
FIG. 2 illustrates an example system for performing deployment.

FIG. 2 illustrates a system 200 for implementing deployment management according to some embodiments of the invention. System 200 may include one or more users at one or more user stations 224 that operate the system 200 to manage deployment for a topology 240 of components, such as application software 206 and software that runs on an applications server and/or database 210. However, deployment management may be performed for any type of component or service in any type of topology according to embodiments of the invention.

User station 224 comprises any type of computing station that may be used to access, operate, or interface with a deployment manager 214, whether directly or remotely over a network. Examples of such user stations 224 include workstations, personal computers, or remote computing terminals. User station 224 comprises a display device, such as a display monitor, for displaying processing results or data to users at the user station 224. User station 224 also comprises input devices for a user to provide operational control over the activities of some or all of system 200.

Deployment manager 214 provides management for some or all of the deployment services utilized in system 200 against a topology 240 of components. The deployment manager 214 comprises one or more deployment modules 216 to perform activities of deploying deployment data 218 to a topology 240 of components, such as the application 206, application server 208 and/or database 210. The deployment data comprises data corresponding to information needed to perform deployment activities to a topology 240 of components. Such deployment data 216 comprises, for example, software to be provisioned, images to be patched to an application, and/or configuration data or settings.

According to some embodiments, the deployment manager accesses one or more models 220 of the components in the topology 240 to perform deployment activities. The models 220 comprise a representation of the components in the topology 240 that captures the dependencies and relationships of the different members of the topology 240. The models 220 also capture an inventory, metadata, and deployment information for the components in the topology 240.

According to some embodiments, model 220 can include, or be represented as, a graph of dependencies 222 for the software in topology 240. The graph of dependencies 222 identifies the dependent relationships between the software components in the topology 240, where analysis of the graph can be performed to determine the dependent order of deployment for the topology 240.

Figure 5:
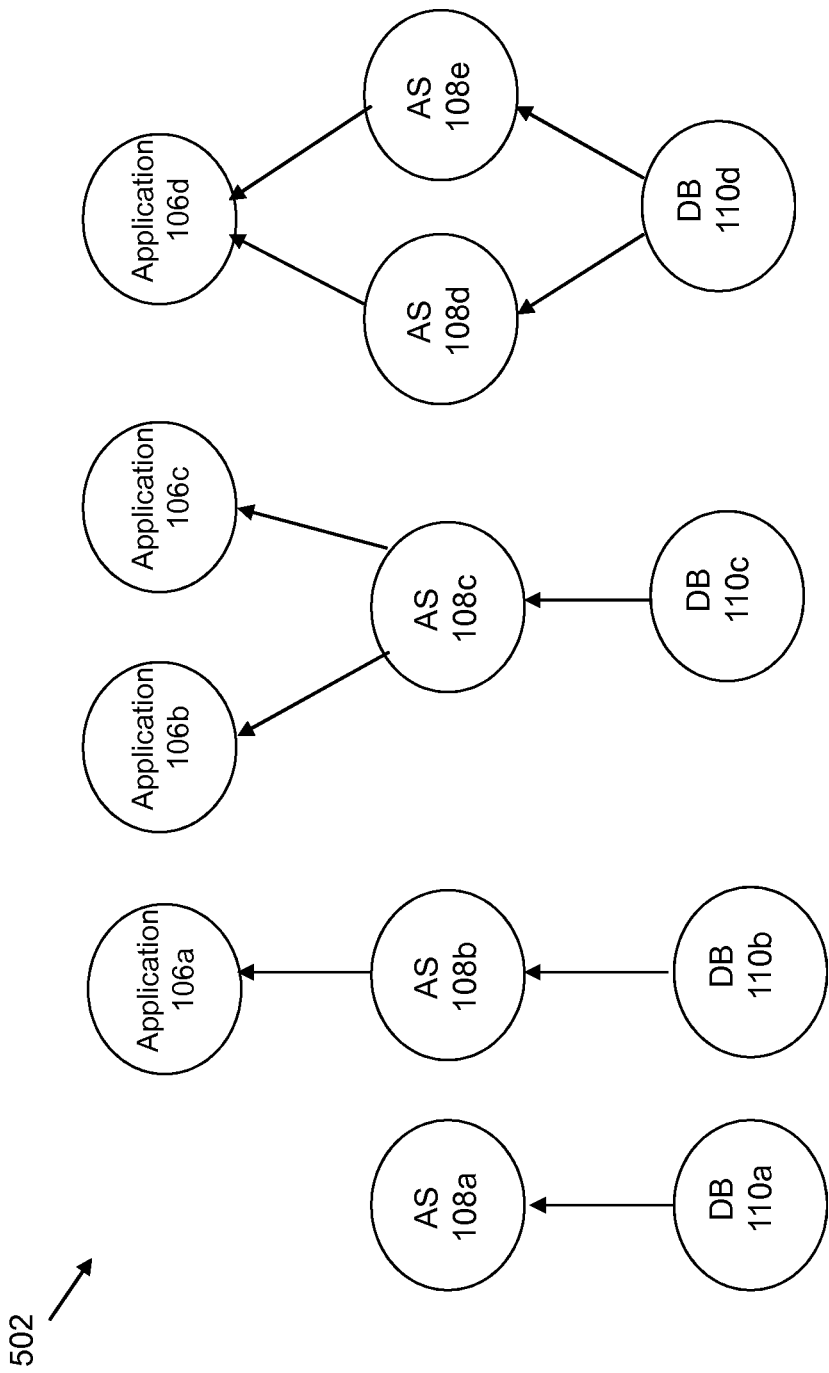

FIG. 5 shows an example dependency graph 502 for the components of the topology shown in FIG. 1. Dependency graph 502 shows that application server 108a is downstream of, and dependent upon, the availability of database 110a. The dependency graph 502 also shows that application 106a is downstream of, and dependent on, application server 108b being available. Application server 108b, in turn, is downstream of and is dependent upon database 110b being available. Applications 106b and 106c are both dependent upon a single application server 108c, which in turn is dependent upon database 110c. Application 106d is dependent upon two application servers 108d and 108e, which are both dependent upon the same database 110d.

The models 220 also include metadata and deployment information for the components in topology 240. FIG. 4 shows an illustrative example of a model 402 that may be used to represent an application server according to some embodiments of the invention. Model 402 includes a first portion 404 to hold general metadata about the application server, such as for example, name-value pair information, port numbers, and other relevant identifiers.

Model 402 also includes a section 406 to hold deployment operation information for the application server. Such deployment operation information identifies the deployment procedures that pertain to the component in question. In the present example, the illustrative deployment procedure set forth in model 402 for an application server is a three step process to first bring down the application server, then perform the deployment procedure (such as a patch), and finally to bring up the application server. One or more scripts, procedures, or utilities may be identified to perform these actions. The operation steps could be customized for the different deployment activities of provisioning, patching, or reconfiguration. Those of ordinary skill in the art will recognize that this illustrative example provides a very simple series of steps for the deployment; of course an actual implementation of the invention may involve much more complex deployment procedures and steps depending upon the type of component being modeled.

Exceptions and optimizations to the deployment procedures may also be set forth in model 402. These exceptions and optimizations provide additional handling actions that can be taken to improve the performance of the deployment or to handle special situations relating to the deployment. For example, a possible exception is to establish that the component will be deployed in a standalone mode if there are no dependencies, to avoid taking incurring dependency-related overhead or take actions that otherwise may be taken if there are dependencies upon the component. For instance, if there are dependencies, then the deployment manager may need to bring down a whole chain of dependent components before patching the one item of software that is at issue. If there are no dependencies, then the patch may be performed in a standalone mode where only the software being patched is brought down. Another possible exception may relate to ordering exceptions with regard to components in the topology. Other and additional exceptions and procedures may be employed within embodiments of the invention.

The models can be constructed to address any post or pre deployment activities that need to occur to the components. For example, it is possible that pre-deployment or post-deployment configurations must occur as part of the deployment activities. Such activities can be expressed as part of the deployment procedures in section 406 of the model 402. The model 402 can also take into account any concurrent activities that must occur for the deployment.

Model 402 may also include a portion 408 to identify the relationships for the component being modeled. For example, an application server may have a downstream dependency relationship to applications and an upstream dependency relationship to databases.

While the above illustrate example of a model 402 is directed to an application server, it is noted that a similar model may be implemented for any component in the topology. The model can be implemented as a generic model for certain types of components, e.g., with a generic model for the application, application server, and database. Alternatively, the model can be customized for individual components in the topology.

The current solution enables the user to deploy all software in a topology using the models, where the deployment is orchestrated so that the downtime can be reduced by a considerable amount. The present approach takes the list of deployment items and components being patched, e.g., patches and the software targets being patched, and then determines out the best path based on the dependency graph.

Figure 3:
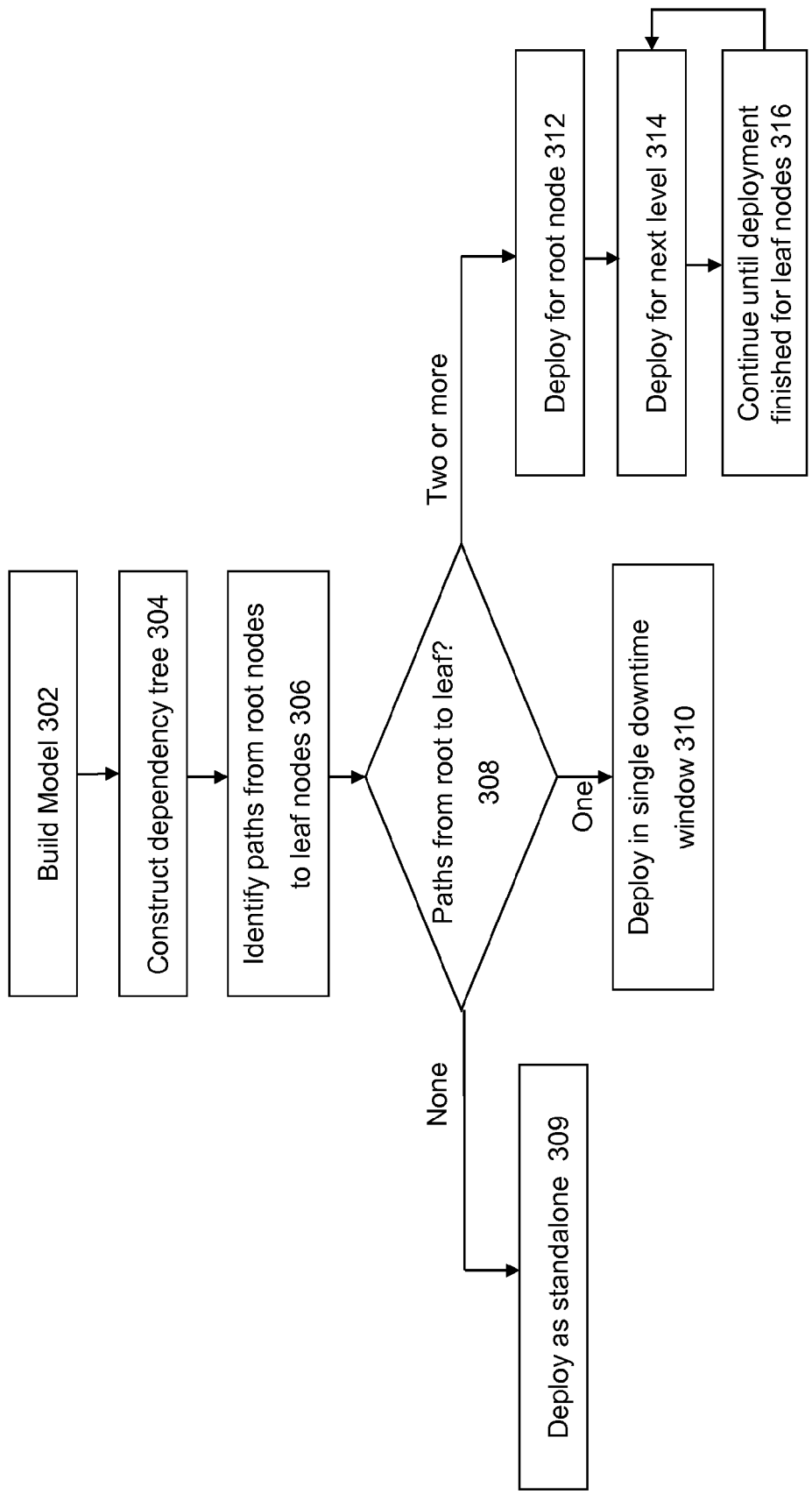
FIG. 3 shows a flow of an approach for performing deployment.

FIG. 3 shows a flowchart of a process for performing deployments according to some embodiments of the invention. At 302, one or more models are constructed for the topology and/or topology components. The model(s) comprise dependency information and deployment metadata for the topology components. Examples of such models are illustrated in FIGS. 4 and 5. Topology models can be constructed in any suitable manner, e.g., by using agent based discovery. The models should include novel metadata, e.g., as represented by the operational metadata shown in 406 of FIG. 4.

At 304, the process builds a dependency tree of the specified targets. The dependency tree is based at least in part on the type of the target(s) being deployed to. The dependency tree comprises root and/or leaf nodes corresponding to the components in the dependency graph which are affected by the deployment. For example, as shown in FIG. 5, one possible root node is database 110*b* and its corresponding leaf node is application 106*a*. The dependency tree can be used to identify the dependency relationships between the various components that should be operated upon for the deployment.

The dependency tree is analyzed, at 306, to determine the paths from root nodes to leaf nodes in the tree, and a determination is made at 308 of the number of such paths. The general idea is that the deployment activities can be optimized based upon the exact portion of the topology affected by the deployment, as well as the dependency relationships for those nodes in the affected portion of the topology. The optimizations can be made to reduce the downtime of components in the topology and to increase the availability of software and systems to users.

For example, consider the situation when both an application and its associated database need to be patched. It is likely that each component will need to be brought down to perform the patching activities for that component. In addition, because there is a dependency relationship between these two components, then both may need to be brought down when only one of these is being patched, e.g., both the application and the database need to be brought down when the database is being patched. As a result, to minimize downtime, the invention could patch both the application and the database in a single downtime session by piggybacking the application patch to the time when the database patch is occurring. This reduces the downtime that may occur if the patching activities occur in two different sessions.

Therefore, the present approach will look at the targets of the deployment activities, as well as their interrelationships. If any target has only a single node, then it is a single node tree and does not have any paths between root and leaf nodes, and therefore this means that the target is an independent target which can be patched/deployed to at 309 without any dependency issues as standalone software.

If there is only one path from root node to the leaf node, then at 310, all the software targets can be patched/deployed to in single downtime window. In this case, the downtime for the root node will be the sum of patching for each of the child nodes. This situation can also be handled by performing the deployment separately for both nodes, which is less optimal in some situations since it will involve two separate downtimes.

If there are two or more paths from a root node to the leaf node, then the process will, at 312, first patch/deploy to the root node. Next, at 314, the process will patch the second level nodes ensuring that at least one path is available from root node to leaf node. This continued from 316 back to 314 until the leaf nodes are all patched. The downtime of the root node in this situation will be the time required for patching that node.

To illustrate this process, consider the following generic configuration that can be extended to a variety of cases, for the purpose of understanding this method. A use case is the patching of an application Human Resource Management System (HRMS). The application runs on an Application Server, which uses a Database. These software components require an operating system. Also they may reside on a single machine or on different machines. Moreover they can be distributed across multiple distributed machines (e.g., using the Real Application Clustering (RAC) technology available from Oracle Corporation of Redwood Shores, Calif.). In this scenario, deployment for the complete topology should be orchestrated to ensure a least downtime period for the application when patching to the whole set.

Consider if the application HRMS is being deployed on two Application Servers (A1 and A2) and these are running using two Database Servers (D1 and D2), with all of these running on two Hosts (H1 and H2). Assume that a dependency tree is constructed having the following dependency relationship:

Application depends on Application Server
Application Server depends on Database, where the Application Server uses the Database for the correct functioning of the applications
The Database and Application Server depends on the Host.

Here, the HRMS is the root node and the H1/H2 are the leaf nodes. There are several possible paths from root node to the leaf node:

HRMS->A1->D1->H1
HRMS->A1->D2->H2
HRMS->A2->D2->H2
HRMS->A2->D2->H1

The above paths can be used to ensure the application HRMS is down only for the time required to patch only this application. In this case, the following actions are performed:
a. First patch the HRMS application
b. Next patch A1, D1 and H1
c. Then patch A2, D2 and H2

With the above actions, the application HRMS will be down only during step (a) and will be available while the other supporting soft wares are being patched. The above use case only considers patching one node. Moreover the patching algorithm assumes that patching requires shutting down software, replacing bits, and restarting the software. However the graph algorithm can be extended to handle a variety of test cases such as 1) patching multiple software components (equivalent to nodes in a dependency graph) 2) patches in (1) above may be co-/pre-/post-requisite patches 3) other deployment activities such as provisioning and cloning can be interspersed with patching 4) multiple applications may be running on a farm of application server 5) operating system patching and provisioning can be part of the enterprise deployment operations.

As additional illustrative examples, consider if it is desired to patch the software on the application server tier 122 shown in FIG. 1, which includes application servers 108a, 108b, 108c, 108d, and 108e. Recall that FIG. 5 shows an example dependency graph that has been modeled for the topography of FIG. 1.

Figure 6B:
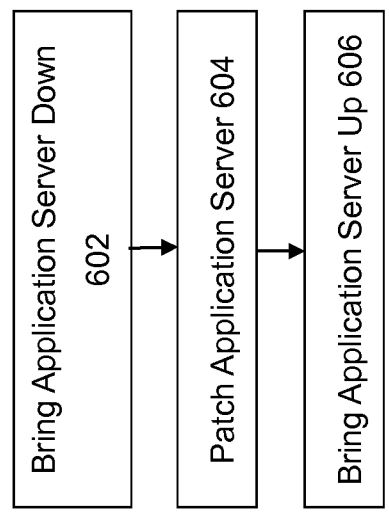

Consider first the actions for patching to the software on application server 108a. FIG. 6A shows the dependency tree that is constructed from the dependency graph of FIG. 5 when it is desired to patch to application server 108a. In this example, there the dependency tree shows only a node for the application server 108a. This is because there are no other nodes that are dependent upon the application server node 108a, and therefore the dependency tree will not include any other nodes. As such, as shown in FIG. 6B, the patching of application server 108a can be handled as if application server 108a is a standalone node. Therefore, only the one application server 108a is brought down at 602 (with no other nodes needing to be brought down at this time). At 604, the software at application server 108a is patched, and once the patching is complete, then application server 108a can be brought back up at 606.

Consider now the actions for patching to the software on application server 108b. FIG. 7A shows the dependency tree that is constructed from the dependency graph of FIG. 5 when it is desired to patch to application server 108b. Here, the dependency tree includes two nodes, with the application server 108b at the root node and the application 106a at the leaf node. In this situation, this dependency tree clearly shows that there is at least one other node that is dependent upon application server 108b, since application 106a is dependent upon the application server 108b. What this means is that since application 106a is dependent upon application server 108b, additional orchestration must be performed to ensure proper ordering of actions when performing the patching/deployment.

Figure 7B:
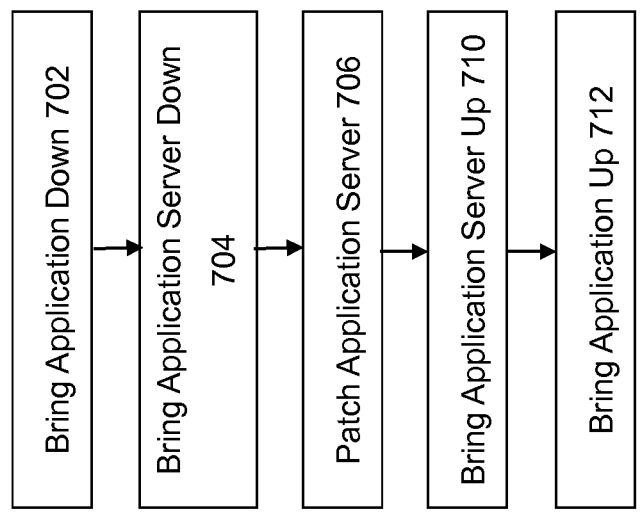

FIG. 7B shows the process for performing a deployment in this situation. Because of the dependency of the application 106a to application server 108b, this means that coordination of both nodes must occur to handle the deployment to application server 108b. Here, the leaf node 106a is brought down first at 702, followed at 704 by bringing down the application server node 108b. At this point, with both nodes down, the application server 108b can be patched at 706. Once the patching is complete, then application server 108b can be brought back up at 710, and then the application is brought up at 712.

Consider if deployment needs to occur for both the application 106a and the application server 108b. As can be seen from FIG. 7C, the dependency tree for this situation is exactly the same as the dependency tree of FIG. 7A when patching just the single node 108b. Therefore, the potential downtime for both patching scenarios is exactly the same. In this situation, rather than engaging in two separate procedures for the deployments to the two nodes, the same downtime can be used to perform the patching for both nodes. This optimization therefore provides a way to accomplish required deployments within minimal downtime by using the dependency tree to recognize that additional patching can be "piggy-backed" onto existing patching downtimes.

Figure 7D:
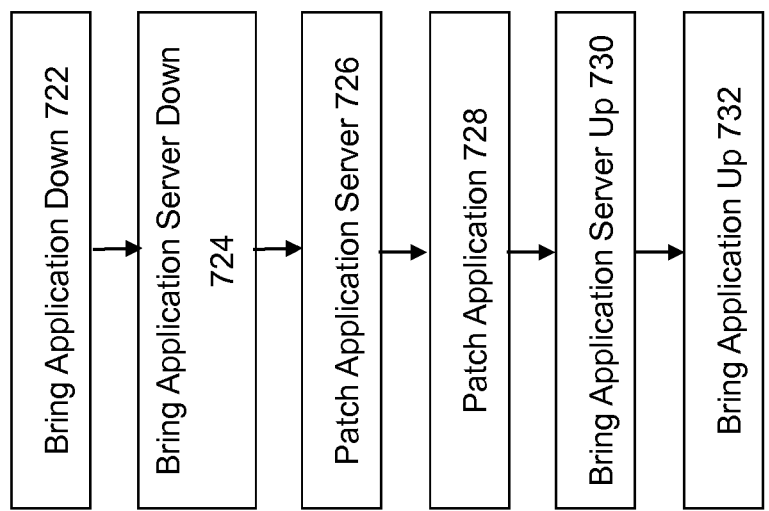

FIG. 7D shows the process for performing a deployment in this situation. Because of the multiple patching that needs to occur, this means that multiple patching actions are performed. Here, as before, the leaf node 106a is brought down first at 722, followed at 724 by bringing down the application server node 108b. At this point, with both nodes down, the application server 108b can be patched at 726, followed by the patch of the application 106a at 728. Once the patching of the two nodes are complete, then application server 108b can be brought back up at 730, followed by bringing the application back up at 732.

Figure 8A:
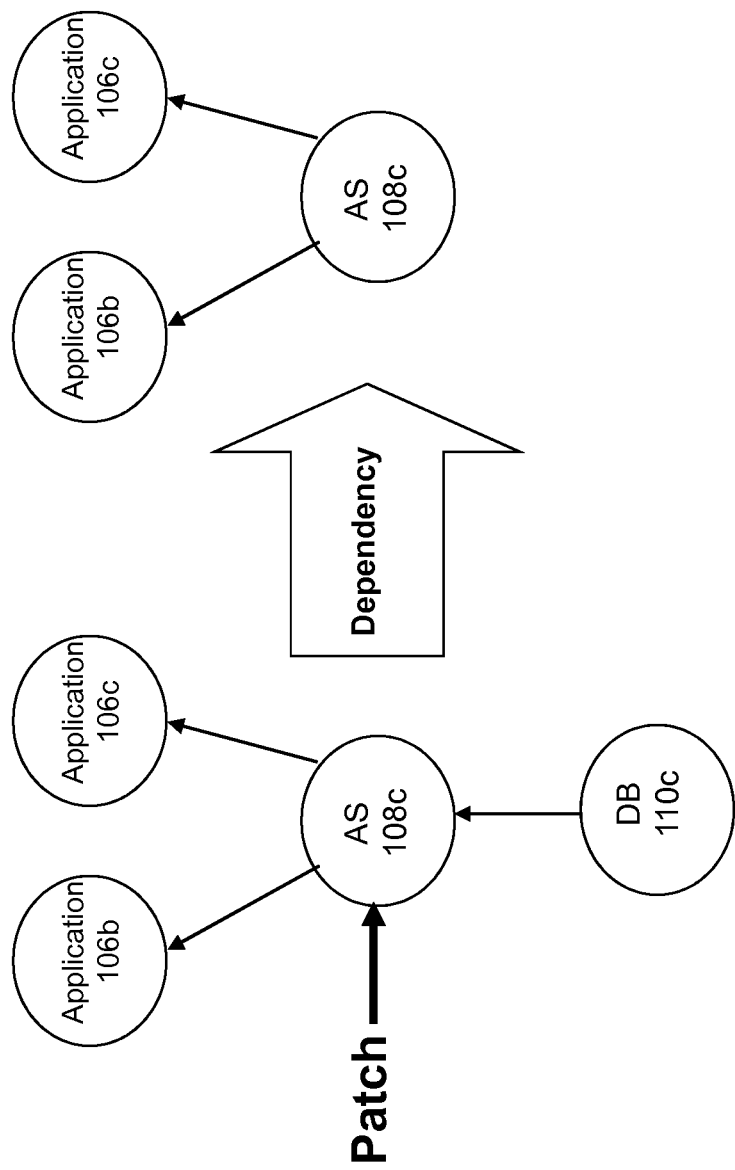

Consider now the actions for patching to the software on application server 108c. FIG. 8A shows the dependency tree that is constructed from the dependency graph of FIG. 5 when it is desired to patch to application server 108c. Here, the dependency tree includes three nodes, with the application server 108c at the root node and the applications 106b and 106c at the leaf nodes. In this situation, this dependency tree shows that there are two nodes node that are dependent upon application server 108c, since applications 106b and 106c are dependent upon the application server 108c. What this means is that since both applications 106b and 106c are dependent upon application server 108c, additional orchestration must be performed to ensure proper ordering of actions when performing the patching/deployment.

Figure 8B:
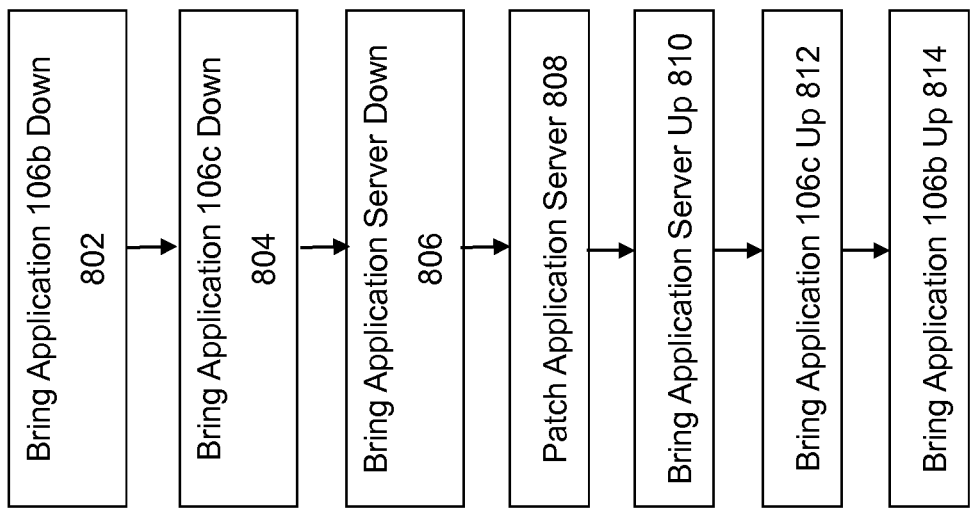

FIG. 8B shows the process for performing a deployment in this situation. Because of the dependency of both applications 106b and 106c to application server 108c, this means that coordination of all three nodes must occur to handle the deployment to application server 108c. Here, the leaf node 106b is brought down first at 802 and the leaf node 106c is brought down at 804. This is followed at 806 by bringing down the application server node 108c. At this point, with all three nodes down, the application server 108c can be patched at 808. Once the patching is complete, then application server 108c can be brought back up at 810. At this point, both applications can be brought back up, with the application 106c brought up at 812 and application 106b brought up at 814.

Consider now the actions for patching to the software on application server 108d. FIG. 9 shows the dependency tree that is constructed from the dependency graph of FIG. 5 when it is desired to patch to just the application server 108d. In this example, there the dependency tree shows only one node for the application server 108d. Even though there is an application node 106d that is dependent upon application server 108d, this application node 106d is also dependent upon another application server 108e. So long as application server nodes 108d and 108e are not both brought down at the same time, this means that application 106d has a dependency path that will not be blocked by the deployment to application server 108d. As such, the dependency tree will only include a single node for application server 108d.

To minimize downtime, this means that only the single node for the application server 108d will be brought down for the deployment, allowing application 106d and application server 108e to stay up through this deployment process. As such, the patching of application server 108d can be handled as if application server 108d is a standalone node. Therefore, the flow of FIG. 6B can be re-used for this deployment process, with only the one application server 108d being brought down at 602 with no other nodes needing to be brought down at this time. At 604, the software at application server 108d is patched, and once the patching is complete, then application server 108d can be brought back up at 606.

Figure 10:
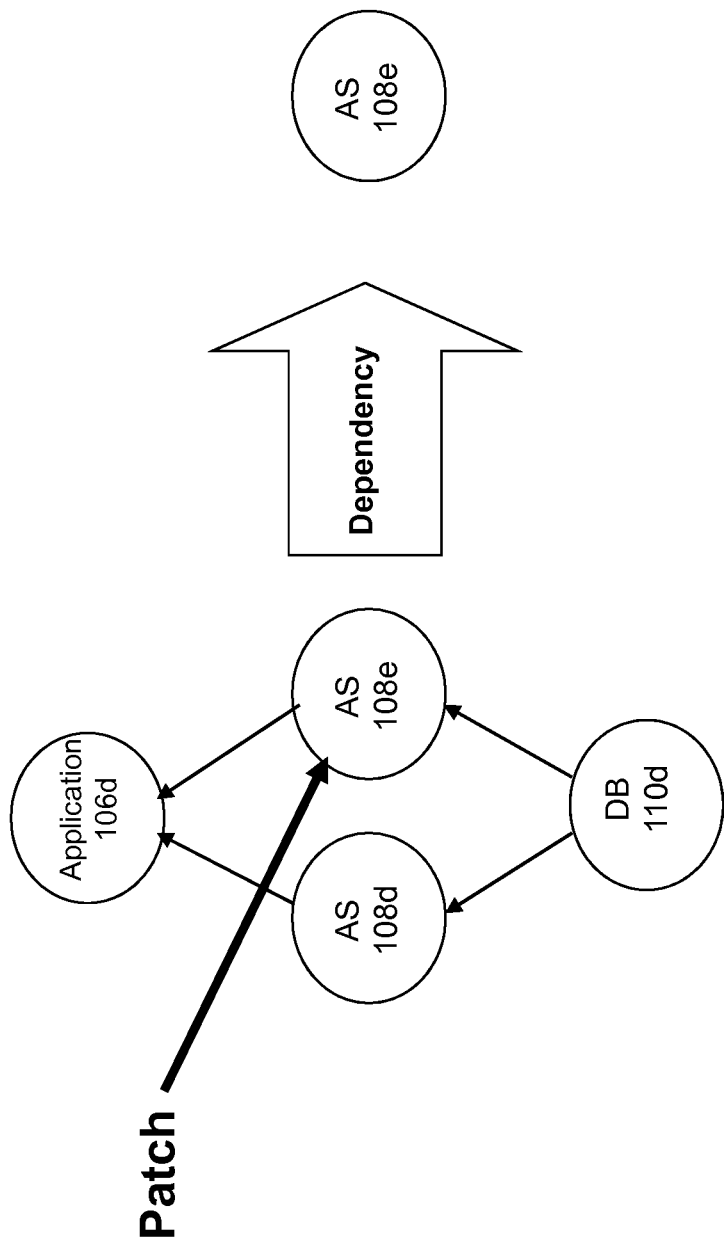

Consider now the actions for patching to the software on application server 108e. FIG. 10 shows the dependency tree that is constructed from the dependency graph of FIG. 5 when it is desired to patch to just the application server 108e. In this example, the dependency tree shows only one node for the application server 108e. It is noted that this dependency tree of FIG. 10 is identical to the dependency tree of FIG. 9, with the exception that single node in FIG. 10 is 108e instead of 108d. However, like the previous situation described for FIG. 9, even though there is an application node 106d that is dependent upon application server 108e, this application node 106d is also dependent upon another application server 108d, which means that so long as application server nodes 108d and 108e are not both brought down at the same time, then the application 106d has a dependency path that will not be blocked by the deployment to application server 108e. As such, the dependency tree will only include a single node for application server 108e. As before, to minimize downtime, this means that only the single node for the application server 108e will be brought down for the deployment, allowing application 106d and application server 108d to stay up through this deployment process. As such, the patching of application server 108e can be handled as if application server 108e is a standalone node, with the flow of FIG. 6B being re-used for this deployment process with only the one application server 108e being brought down at 602 with no other nodes needing to be brought down at this time. At 604, the software at application server 108e is patched, and once the patching is complete, then application server 108e can be brought back up at 606.

Figure 11A:
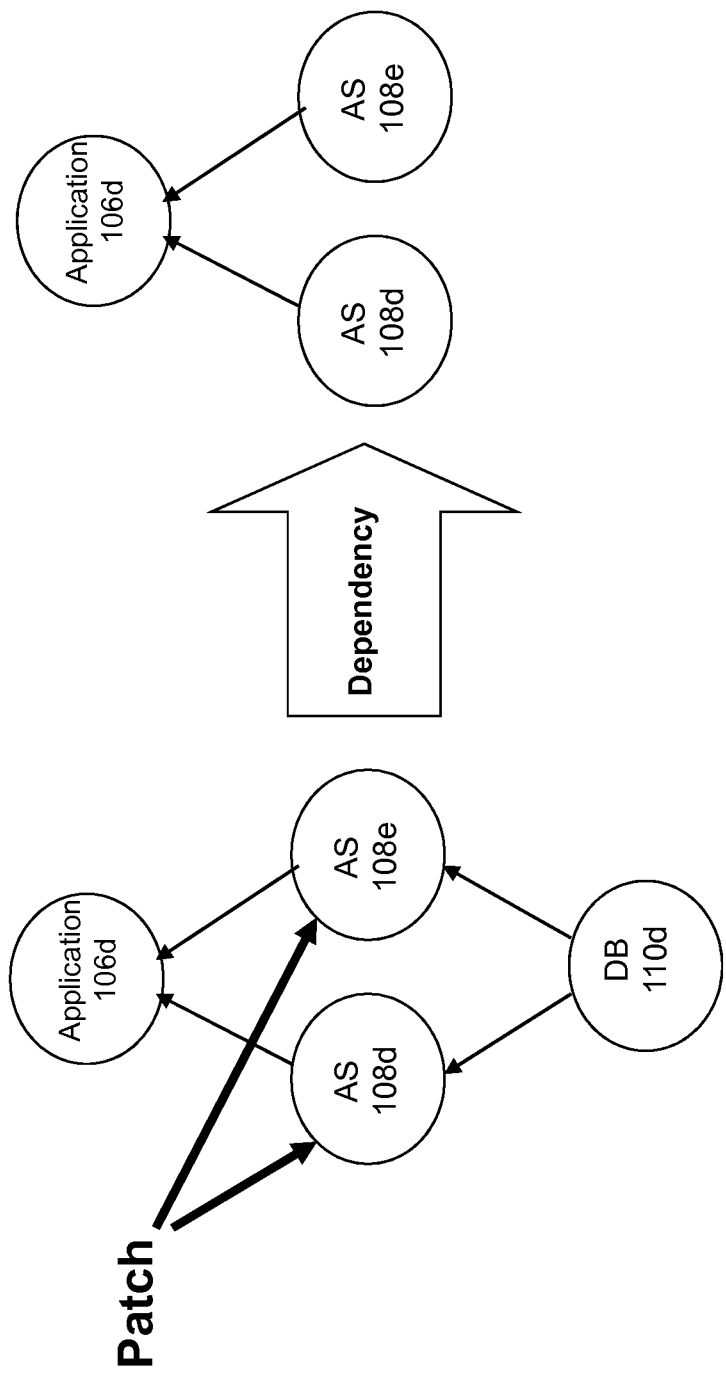

Consider if the patching needs to occur for both application servers 108d and 108e. FIG. 11A shows the dependency tree that is constructed from the dependency graph of FIG. 5 when it is desired to patch both application servers 108d and 108e. In this situation, the dependency tree shows the application 106d along with both application server nodes 108d and 108e. Since both application server nodes 108d and 108e are being patched, and application 106d is dependent upon both applications servers, then additional orchestration must be performed to ensure proper ordering of actions when performing the patching/deployment.

Figure 11B:
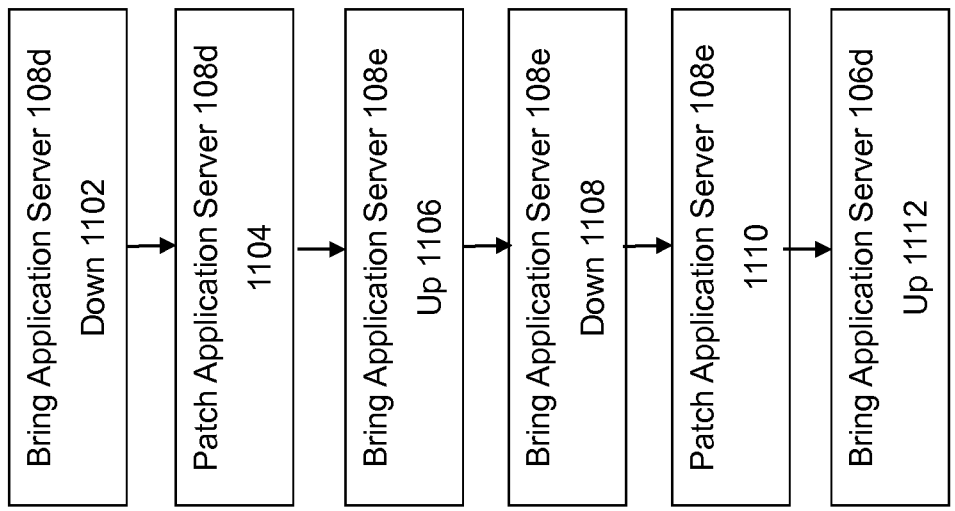

FIG. 11B shows the process for performing a deployment in this situation. Here, since there are multiple paths from the root node to the leaf node, this means that an optimization can be made to maintain uptime for the application 106d. Therefore, application 106d does not need to be brought down. Instead, each of the application servers 108d and 108e can be separately brought down and patched to maintain uptime for the application 106d.

At 1102, application server 108d is brought down, while keeping both application 108d and application server 108e up. The down application server 108d is patched at 1104, and once the patching is complete, then the application server 108d can be brought back up at 1106. At 1108, application server 108e is brought down, while keeping both application 108d and application server 108d up. The down application server 108e is patched at 1110, and once the patching is complete, then the application server 108e can be brought back up at 1112.

Figure 11C:
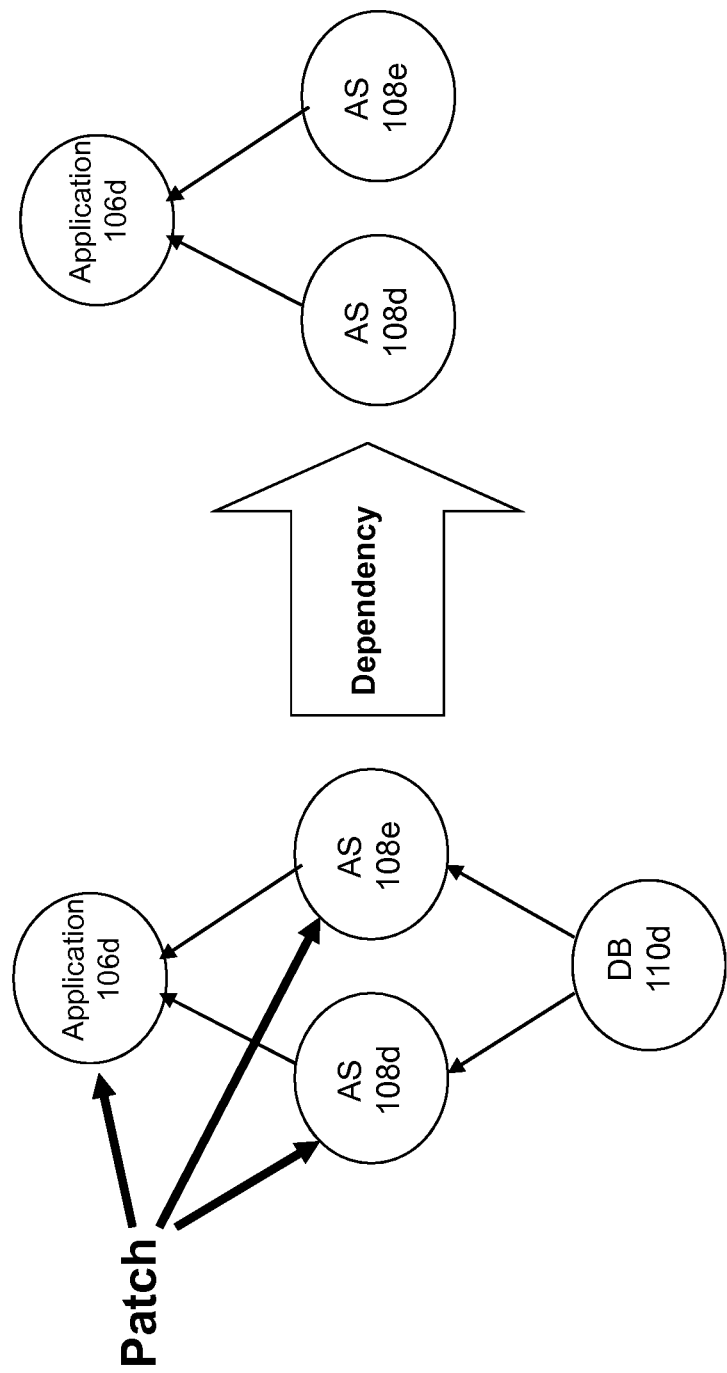

Consider if the patching needs to occur for the application 106d as well as both application servers 108d and 108e. FIG. 11C shows the dependency tree that is constructed from the dependency graph of FIG. 5 when it is desired to patch both application servers 108d and 108e. In this situation, the dependency tree shows the application 106d along with both application server nodes 108d and 108e.

Here, it is not necessary to maintain the immediate uptime for application 106d, since this node itself needs to be patched. Therefore, to minimize downtime, an optimization can be taken to make sure that all three nodes are patched in the same downtime window.

Figure 11D:
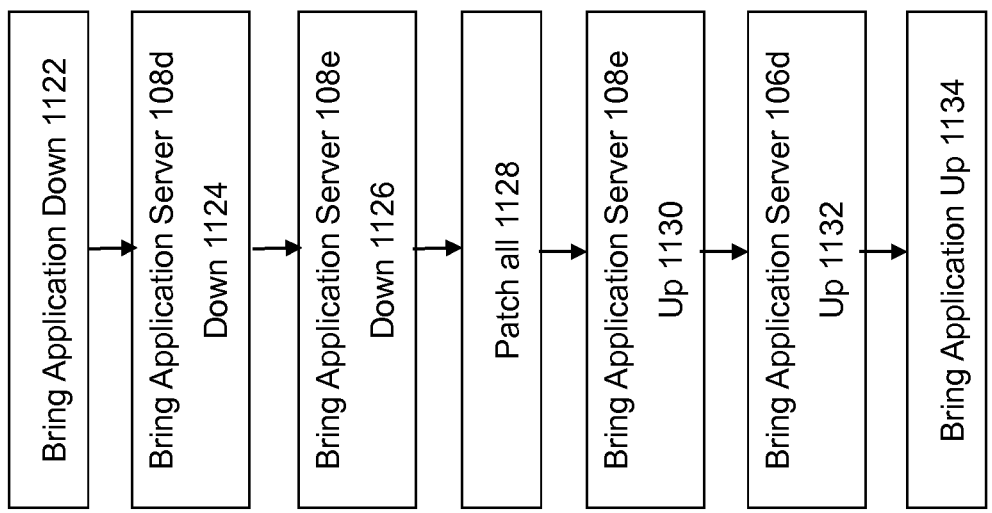

FIG. 11D shows the process for performing a deployment in this situation. Here, the application 106d is brought down first at 1122. The application server 108d is brought down at 1124 and the application server 108e is brought down at 1126. With all nodes down, the application 106d and application servers 108d and 108e are all patched at 1128. Once the patching is complete, then the application servers can be brought back up, with application server 108e being brought up at 1130 and application server 108d being brought up at 1132. Once the application servers have been brought up, then the application is brought up at 1134.

FIGS. 9-11D illustrate examples of situations in which different optimizations may be taken depending upon the specific needs of the deployment. If application 106d does not need to be brought down, then patching for each of the application servers 108d or 108e can be separately handled to avoid bringing application 106d down, as described above.

It is possible that even if both application servers 108d and 108e need to be patched, but to minimize downtime of application 106d, then the patching occurs in two different sessions such that application 106d never needs to be brought down. This would involve the sequential implementations of FIG. 9 and FIG. 10 where the patching to application servers 108d and 108e are handled in entirely different downtime sessions.

However, the application 106d may need to be brought down, e.g., because this node itself must be patched. In this situation, the system would take advantage of this required downtime to patch all of the application 106d, application server 108d, and application server 108e. By handling the patching all at once, this limits the downtime to a single downtime session for all three components.

Therefore, what has been described is an improved approach for performing deployment in an automated manner. Prior to this invention, patching a set of software required a significant amount of manual work in orchestrating the process, with the distinct possibility that the required downtime defined for the applications/services is high. In contrast, embodiments of the present invention provide a universal approach that can be used with minimal manual interactions to perform deployment, and which can also minimize downtime.

Figure 12:
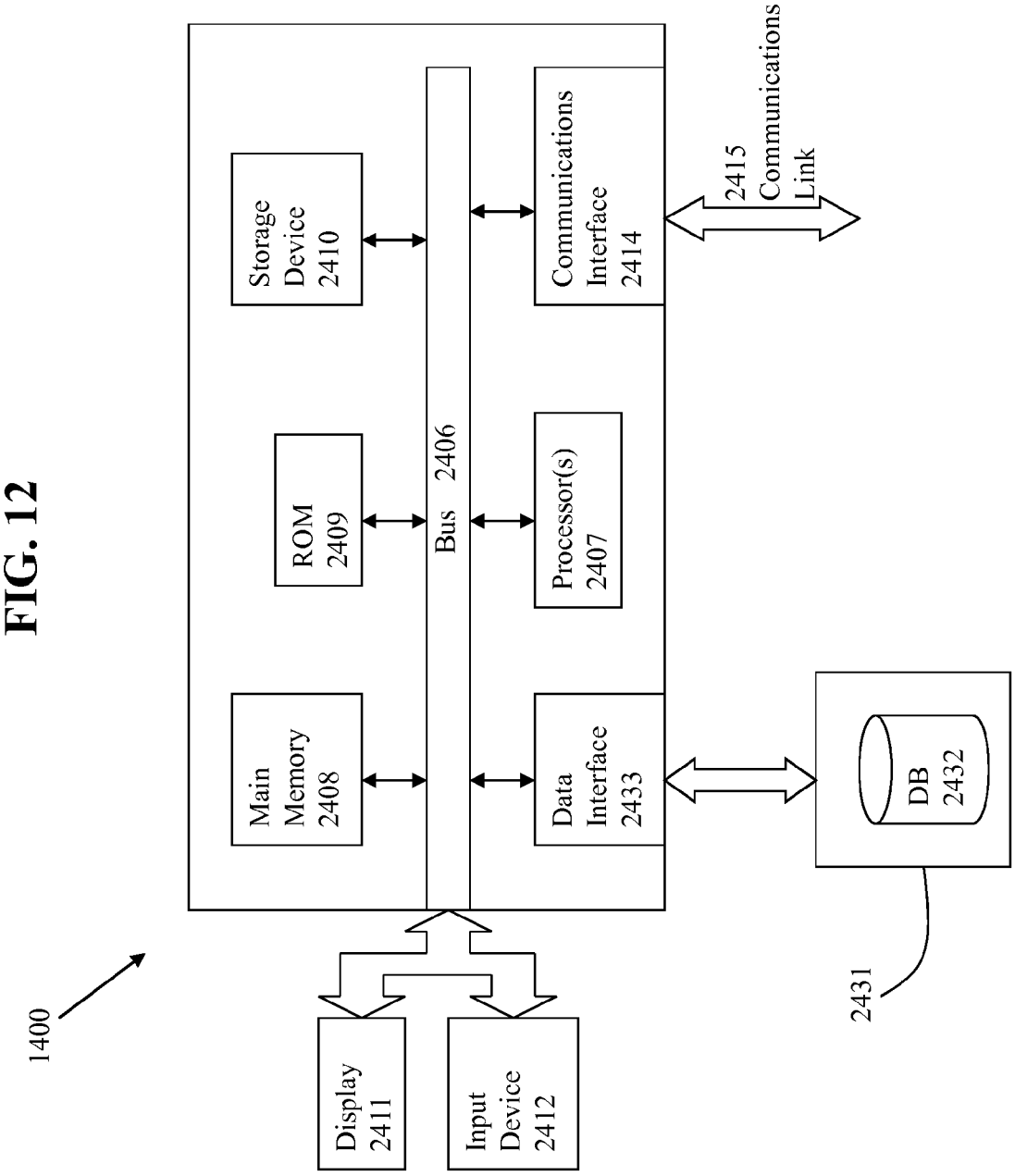
FIG. 12 depicts a computerized system on which a method for re-using digital assertions in a mixed signal context can be implemented.

One advantage of some embodiments is that end to end deployment can be automated and optimized for a variety of software stacks and is not limited to particular well-known use cases. In addition, enterprise deployment can be addressed for a new stack without requiring development of a new orchestration strategy catered for that configuration. The approach of various embodiments automatically generates the best possible policy for each configuration. Moreover, embodiments can be used to manage many products as one stack. This approach can be used to ensure minimum downtime, minimum business interruptions, and high-availability. In addition, all systems in the topology can be deployed under best-practices from developers and vendors. The approach also significantly reduces administration costs by reducing human intervention System Architecture Overview FIG. 12 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for performing deployment with a processor, comprising:

identifying a model corresponding to a topology, where the model corresponds to an inventory of components in the topology and dependency relationships for the components;

using the model to identify dependencies for a deployment, wherein the identified dependencies are based at least in part upon a dependency tree having one or more root nodes and one or more leaf nodes;

counting a number of paths from a root node to a leaf node in the dependency tree;

based at least in part on the identified dependencies and the number of paths counted, selecting a deployment procedure from a plurality of deployment procedures, wherein if the number of paths counted is two or more paths, at least one of the deployment procedures comprises a deployment to a first node in a first path in a first downtime window and a deployment to a second node in a second path in a second downtime window, wherein the first downtime window ends before the second downtime window starts and at least one path from the root node to the leaf node is available during deployment to the first node and during deployment to the second node; and implementing the selected deployment procedure to perform the deployment in the topology.

2. The method of claim 1 in which the model comprises a dependency graph for the components.

3. The method of claim 1 in which the model comprises operational steps to perform the deployment.

4. The method of claim 3 in which the operational steps comprise optimizations based at least in part upon the existence of other components that are subject to the deployment.

5. The method of claim 4 in which the optimizations are used to minimize downtime for the components.

6. The method of claim 1 in which the model is generic to a class of the components or is specific to an individual component.

7. The method of claim 1 in which one path from root node to leaf node is handled in a single downtime window.

8. The method of claim 1 in which there are multiple paths root node to leaf node, and where the components are patched to ensure at least one path is available from the root node to the leaf node.

9. The method of claim 1 in which the deployment comprises provisioning, patching, configuration, or reconfiguration.

10. The method of claim 1 in which the implementing the selected deployment procedure comprises performing a first action when the number of paths is a first value, performing a second action when the number of paths is a second value, and performing a third action when the number of paths is a third value.

11. A computer program product embodied on a non-transitory computer usable medium, the computer usable medium having stored thereon a sequence of instructions which, when executed by a processor causes the processor to execute a method for performing deployment with, the method comprising:

identifying a model corresponding to a topology, where the model corresponds to an inventory of components in the topology and dependency relationships for the components;

using the model to identify dependencies for a deployment, wherein the identified dependencies are based at least in part upon a dependency tree having one or more root nodes and one or more leaf nodes;

counting a number of paths from a root node to a leaf node in the dependency tree;

based at least in part on the identified dependencies and the number of paths counted, selecting a deployment procedure from a plurality of deployment procedures, wherein if the number of paths counted is two or more paths, at least one of the deployment procedures comprises a deployment to a first node in a first path in a first downtime window and a deployment to a second node in a second path in a second downtime window, wherein the first downtime window ends before the second downtime window starts and at least one path from the root node to the leaf node is available during deployment to the first node and during deployment to the second node; and implementing the selected deployment procedure to perform the deployment in the topology.

12. The computer program product of claim 11 in which the model comprises a dependency graph for the components.

13. The computer program product of claim 11 in which the model comprises operational steps to perform the deployment.

14. The computer program product of claim 13 in which the operational steps comprise optimizations based at least in part upon the existence of other components that are subject to the deployment.

15. The computer program product of claim 14 in which the optimizations are used to minimize downtime for the components.

16. The computer program product of claim 11 in which the model is generic to a class of the components or is specific to an individual component.

17. The computer program product of claim 11 in which one path from root node to leaf node is handled in a single downtime window.

18. The computer program product of claim 11 in which there are multiple paths root node to leaf node, and where the components are patched to ensure at least one path is available from the root node to the leaf node.

19. The computer program product of claim 11 in which the deployment comprises provisioning, patching, configuration, or reconfiguration.

20. The computer program product of claim 11 in which the implementing comprises deploying as a standalone when the number of paths is zero, deploying in a single downtime window when the number of paths is one, and deploying includes piggybacking when the number of paths is more than one.

21. A computer-based system for performing deployment, comprising:

a computer processor to execute a set of program code instructions;

a memory to hold the program code instructions, in which the program code instructions comprise program code to:

identify a model corresponding to a topology, where the model corresponds to an inventory of components in the topology and dependency relationships for the components, use the model to identify dependencies for a deployment, wherein the identified dependencies are based at least in part upon a dependency tree having one or more root nodes and one or more leaf nodes, count a number of paths from a root node to a leaf node in the dependency tree, select a deployment procedure from a plurality of deployment procedures based at least in part on the identified dependencies and the number of paths counted, wherein if the number of paths counted is two or more paths, at least one of the deployment procedures comprises a deployment to a first node in a first path in a first downtime window and a deployment to a second node in a second path in a second downtime window, wherein the first downtime window ends before the second downtime window starts and at least one path from the root node to the leaf node is available during deployment to the first node and during deployment to the second node, and implement the deployment procedure to perform the deployment in the topology.

22. The system of claim 21 in which the model comprises a dependency graph for the components.

23. The system of claim 21 in which the model comprises operational steps to perform the deployment.

24. The system of claim 23 in which the operational steps comprise optimizations based at least in part upon the existence of other components that are subject to the deployment.

25. The system of claim 24 in which the optimizations are used to minimize downtime for the components.

26. The system of claim 21 in which the model is generic to a class of the components or is specific to an individual component.

27. The system of claim 21 in which one path from root node to leaf node is handled in a single downtime window.

28. The system of claim 21 in which there are multiple paths root node to leaf node, and where the components are patched to ensure at least one path is available from the root node to the leaf node.

29. The system of claim 21 in which the deployment comprises provisioning, patching, configuration, or reconfiguration.

30. The system of claim 21 in which the deployment procedure comprises a first action when the number of paths is a first value, a second action when the number of paths is a second value, and a third action when the number of paths is a third value.

\* \* \* \* \*